(12) United States Patent
Feick

(10) Patent No.: US 7,385,365 B2
(45) Date of Patent: Jun. 10, 2008

(54) METHOD FOR THE DETECTION OF ABNORMALITIES OF ELECTRIC MOTORS

(75) Inventor: Stefan Feick, Kirchheimbolanden (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 408 days.

(21) Appl. No.: 10/503,676

(22) PCT Filed: Jan. 15, 2003

(86) PCT No.: PCT/EP03/00302

§ 371 (c)(1),
(2), (4) Date: Aug. 2, 2004

(87) PCT Pub. No.: WO03/069768

PCT Pub. Date: Aug. 21, 2003

(65) Prior Publication Data
US 2005/0092105 A1 May 5, 2005

(30) Foreign Application Priority Data
Feb. 13, 2002 (DE) ............................... 102 06 099
Nov. 23, 2002 (DE) ............................... 102 54 752

(51) Int. Cl.
*H02P 6/00* (2006.01)
(52) U.S. Cl. ........................ 318/400.01; 318/400.07; 318/400.08; 318/400.14; 318/400.15; 318/400.16
(58) Field of Classification Search ............... 318/254, 318/138, 439, 434, 700, 708, 400.01, 400.07, 318/400.08, 400.14, 400.15, 400.16; 361/23
See application file for complete search history.

(56) References Cited

U.S. PATENT DOCUMENTS

| 5,038,092 | A | * | 8/1991 | Asano et al. ............... 318/811 |
| 5,389,825 | A | | 2/1995 | Ishikawa et al. |
| 5,689,170 | A | * | 11/1997 | Ishikawa ..................... 318/811 |
| 5,729,113 | A | * | 3/1998 | Jansen et al. ............... 318/799 |
| 5,963,007 | A | * | 10/1999 | Toyozawa et al. .......... 318/799 |
| 6,112,156 | A | * | 8/2000 | Kang .......................... 702/58 |
| 6,161,068 | A | * | 12/2000 | Kurishige et al. ............ 701/41 |
| 6,188,196 | B1 | * | 2/2001 | Koide et al. ................ 318/700 |

(Continued)

FOREIGN PATENT DOCUMENTS

DE    38 17 916 C2    8/1993

(Continued)

OTHER PUBLICATIONS

German Search Report of Application No. 102 54 752.1 dated Nov. 23, 2002.

(Continued)

*Primary Examiner*—Rita Leykin
(74) *Attorney, Agent, or Firm*—RatnerPrestia

(57) ABSTRACT

In a method for error detection of a brushless electric motor, at least one first motor parameter is measured or determined, and a second, estimated motor parameter is estimated on the basis of the first motor parameter. The second, estimated motor parameter is compared to a second, measured or determined motor parameter. An error of the electric motor can be found out according to the comparison.

7 Claims, 3 Drawing Sheets

U.S. PATENT DOCUMENTS

| | | | |
|---|---|---|---|
| 6,299,261 B1 * | 10/2001 | Weiberle et al. | 303/20 |
| 6,396,229 B1 * | 5/2002 | Sakamoto et al. | 318/439 |
| 6,448,738 B1 * | 9/2002 | Burton et al. | 318/807 |
| 6,462,491 B1 * | 10/2002 | Iijima et al. | 318/254 |
| 6,501,243 B1 * | 12/2002 | Kaneko et al. | 318/700 |

FOREIGN PATENT DOCUMENTS

| | | |
|---|---|---|
| DE | 44 37 793 A1 | 5/1996 |
| DE | 197 09 296 A1 | 9/1998 |
| DE | 199 58 529 A1 | 6/2001 |
| EP | 0 660 503 A1 | 6/1995 |
| EP | 0 739 088 A2 | 10/1996 |
| WO | WO 01/20343 A1 | 3/2001 |

OTHER PUBLICATIONS

International Search Report of Application No. PCT/EP03/00302 dated Jun. 17, 2003.

* cited by examiner

METHOD FOR THE DETECTION OF ABNORMALITIES OF ELECTRIC MOTORS

TECHNICAL FIELD

The present invention relates to a method for detecting abnormalities of a brushless electric motor.

BACKGROUND OF THE INVENTION

Brushless electric motors or electronically commutated electric motors gain significance at an increasing rate. They replace in particular electric motors equipped with brushes in many technical applications. The advantages over motors equipped with brushes involve above all low efforts in maintenance because there is no need for commutator brushes exposed to wear and there is principally a higher efficiency due to the omission of commutator losses caused by brush contact resistances. In addition, functions can be realized in conjunction with 'intelligent' electronic commutation devices that are not possible with brush-fitted motors or can be reached only with major additional mechanical efforts. This additional effort relates to the operation in the zone of weak fields or in the field weakening mode and the realization of a very low waviness of the drive torque.

As the functions of mechanical, inherently much safer and more reliable components (in this case the commutator brushes of a commutator motor) are replaced by mechatronic assemblies in brushless electric motors, appropriate measures must safeguard the fail-safety. A comparatively large number of possible errors are caused due to the relatively high complexity of the commutation electronics.

Reliable error detection is necessary especially for safety-critical applications of electronically commutated electric motors.

BRIEF SUMMARY OF THE INVENTION

An object of the present invention is to disclose a method permitting error detection in brushless electric motors.

This object is achieved with the features of the independent claims.

Dependent claims are directed to preferred embodiments of the invention.

The method for error detection in a brushless electric motor comprises a measurement or determination of at least one first motor parameter according to the invention. A second, estimated motor parameter is estimated on the basis of the at least one first motor parameter. The second, estimated motor parameter is compared to a second, measured or determined motor parameter. An error of the electric motor is found out according to the comparison.

Consequently, the invention provides monitoring the electric motor including the commutation electronics in the sense of an overall test. There is no monitoring of partial components, such as controller monitoring and/or monitoring of end stages. Instead, the system of the electric motor is monitored in all.

Favorably, there is detection of a first class of errors which can cause undesirable motion of the motor, a second class of errors causing electronic clamping of the rotor so that a rotation is no longer possible or highly impaired, and a third class of errors preventing the motor from the development of a torque as a result.

The method is preferably implemented for the error detection of electronically commutated, three-phase, permanently excited synchronous motors SM. Said motors consist of the main assemblies stator with a stator with a stator winding and rotor and include a control unit, in particular a transistor inverter TWR determining an appropriate energization of the stator winding and adjusting it by way of power drivers.

According to the invention, the second, estimated motor parameter is estimated on the basis of a model.

It is arranged for by the invention that an estimated current producing a motor torque or a quantity derived therefrom is estimated as a second, estimated motor parameter and compared with a nominal current producing a motor torque or a quantity derived therefrom as a second motor parameter.

According to the invention, the estimated current producing a motor torque or the quantity derived therefrom is estimated on the basis of at least one phase motor current, preferably three-phase motor currents, and the rotor position or phase position of the electric motor.

Thus, the nominal torque is indirectly predetermined by way of a torque-producing current q_nominal. The torque-producing current q_nominal is directly proportional to the torque T in the stationary condition, while saturation effects are ignored. The necessary energization pattern on the basis of a predetermined q_nominal value can be determined by a stator-oriented or magnet-wheel-oriented current control.

According to the invention, the rotor position or phase position relative to the stator of the electric motor is determined in that the respective actual phase position variation of the rotor relative to the stator is measured. The absolute phase position can be determined therefrom.

The exact angular position or phase position of the rotor can be determined by an absolute position measurement. The absolute measuring system is mounted e.g. on a shaft on which the rotor is seated. Said system indicates at any time the exact angular position of the rotor relative to the stator. For example, so-called resolvers, such as induction meters or rotatable transformers, or Hall sensors can be employed as an absolute measuring system.

The torque applied to the rotor can be determined from the exact angular position or phase position of the rotor relative to the stator, in particular with the knowledge of the phase currents.

It is provided by the invention that the phase currents are estimated on the basis of phase voltages taking into consideration induced countervoltages proportional to rotational speed.

According to the invention, the temperature of the electric motor and/or the windings of the electric motor are measured and taken into account when estimating the estimated currents.

According to the invention, the method and the device are employed especially for brushless electric motors in the field of motor vehicles for use in steering systems such as steer-by-wire systems, or electric servo steering systems, or brake systems such as brake-by-wire systems.

The method of the invention permits preventing errors which can cause an undesirable motion of the actor of the steer-by-wire system or brake-by-wire system (first class of errors), an electronic clamping of the rotor of the motor (second class of errors), or errors due to which torque cannot be built up (third class of errors).

The electric motor driving the actuator is preferably redundantly designed for safety-critical steer-by-wire systems or brake-by-wire systems. When an error is detected, the function of the failing electric motor is then ensured by the redundant systems.

DETAILED DESCRIPTION OF THE PREFERRED EMBODIMENTS

Figure 1:
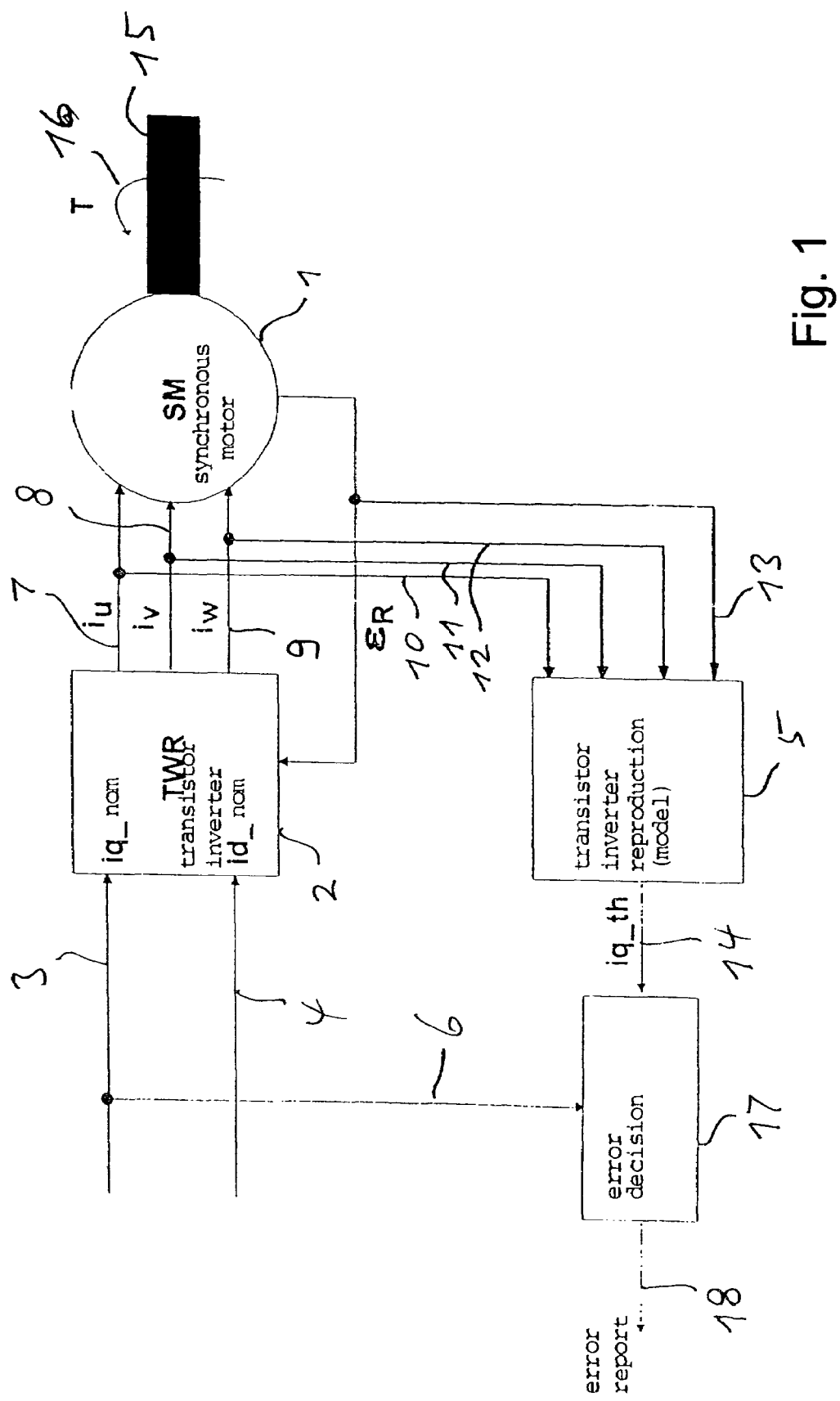
FIG. 1 is a schematic diagram of the method of the invention.

The diagram shown in FIG. 1 depicts the invention method of error detection in the example of an electronically commutated, three-phase, permanently energized synchronous motor SM 1. Said synchronous motor 1 includes a transistor inverter TWR 2 determining an appropriate energization of the stator winding and adjusting the motor phase currents $i_u$ 7, $i_v$ 8, $i_w$ 9 by way of power drivers.

The specification of a nominal torque occurs indirectly by way of the specification of a torque-producing current iq_nominal 3 and a field-weakening current id_nominal 4.

The whole of the motor 1 inclusive the transistor inverter 2 is monitored according to the invention.

To this end, the requested nominal value of the torque-producing current iq_nominal 6 and data about the motor phase currents $i_u$ 10, $i_v$ 11, $i_w$ 12 are sent to a monitoring unit 5.

The monitoring unit 5, 17 is used to determine an estimated value for the torque-producing current iq_th 14 on the basis of the motor phase currents $i_u$ 10, $i_v$ 11, $i_w$ 12 and a determined mechanic rotor position angle $\epsilon_R$ 13. This determination is preferably carried out by means of a model-based reproduction of the transistor inverter 2.

The estimated value indirectly indicates also the torque 16 that is theoretically applied to a motor shaft or drive shaft 15.

In consideration of the dynamics of the current control circuit, the estimated value iq_th is compared with the nominal value of the torque-producing current iq_nominal by way of an error detection unit 17. An alarm is issued at 18 when a significant discrepancy prevails between iq_th and iq_nominal. To consider errors in the stator windings and the current-measuring sensor system, it is checked in addition whether the sum of currents of the star-connection operated motor is zero:

$$i_u + i_v + i_w = 0$$

Observer structures or parity models can be used in a classical way to take into account the dynamics of motor current control.

For defined cases of application, said dynamics is considered only by adding a response time before an alarm. This is illustrated in FIG. 2.

Figure 2:
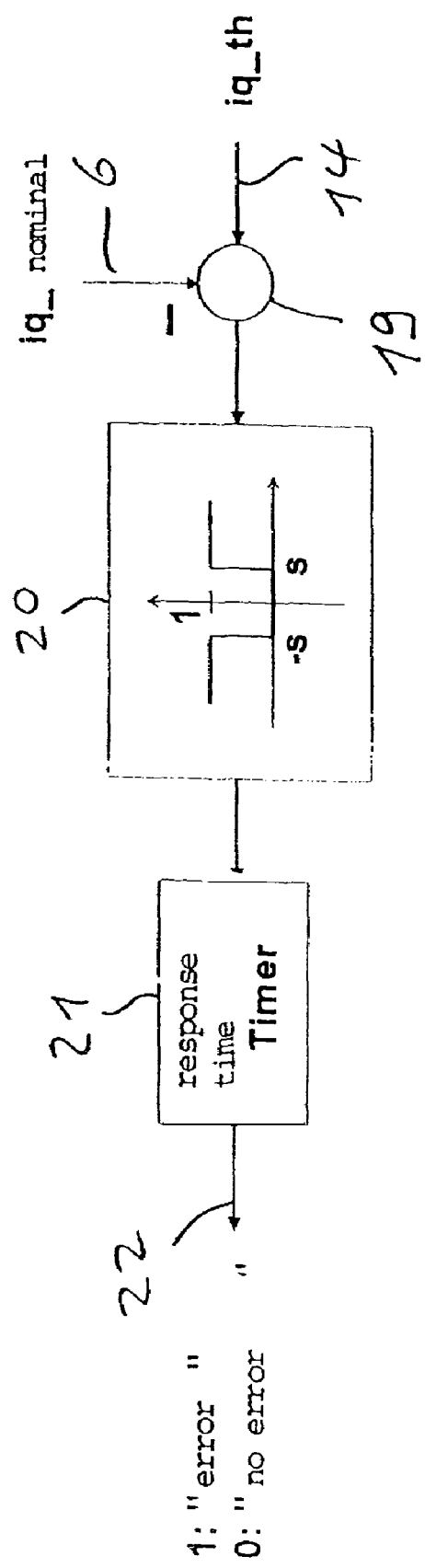
FIG. 2 is a sectional view of the method of the invention with respect to the error decision.

FIG. 2 shows a design of a structure of decision for detecting an error 17. The difference between the two input quantities iq_nominal 6 and iq_th 14 is produced at 19. The amount of the difference is compared with a threshold value s at 20. Said threshold value can also be varied according to further quantities (adaptive threshold value). Higher threshold values are fixed in block-commutated motors compared to sine-commutated motors. A timer 21 is started when a significant discrepancy between the amount of the difference and the threshold value is detected in step 20. The timer 21 is decremented again until the value zero when the significant discrepancies disappear. There is an output at 22 when a predetermined count of the counter is exceeded.

This method allows a quickest possible error detection of 'serious' errors. The exact location of the error and the cause of trouble is less significant for these applications. Thus, the method of the invention is first of all especially suited for a quick error detection of the three classes of errors described hereinabove, with only their appearance being indicated. Any extensions, which additionally allow indications of the error location and the cause of trouble, are however feasible and can be integrated into the method.

The actuator concerned, e.g. the motor 1 driving the drive shaft 15, is disconnected in the way of a 'collective' error treatment (fail-silent behavior) when an error is detected, and redundant systems are activated.

A detailed error diagnosis will then take place within the limits of a repair or automatically after the deactivation under operating conditions suitable herefor by means of corresponding algorithms and sequences.

It is the special advantage of the invention that all previously mentioned classes of errors induced by malfunctions of the control unit 2 (automatic motion, electric clamping, failure of the motor) can be detected due to the principle of the overall test in conjunction with the test of current sums, irrespective of where the cause of the trouble is originally localized, e.g. an erroneous transfer of nominal values, a defective rotor position sensor system, or a defective end stage for actuation of motor 1.

A brushless motor 1 can also be impaired by errors which, although they represent a deviation from a normal function, either impair the torque production of the motor 1 not at all or only minimally such as errors that cause a reduction of a boosting factor in the control unit 2. As long as the method does not signal an error, it is not necessary to deactivate the actuator 1. The output torque generally corresponds to the preset nominal value. The control unit 2 adjusts the errors in these cases. Thus, said errors are seized by the 'robustness' of the control circuit and do not require any countermeasures.

The dynamics of error detection lies in the magnitude of the time constant of the motor current control and, hence, amounts to normally <<10 ms, meaning it is quicker than methods that do without the evaluation of the motor current data and instead use purely mechanical actuator parameters such as rotor acceleration, rotor speed, or rotor position.

Further, the error detection method is of universal use in electronically commutated motors with a position sensor equipment, irrespective of the implemented principle of the motor control and, consequently, is especially well suited both for a magnet-wheel oriented and a stator-oriented control.

In contrast to methods where only the sense of direction of the torque is evaluated, the present method favorably allows detecting also errors that cause torque increase or decrease. It also allows detecting errors causing waviness of the drive torque. This is of great significance above all in systems with a tactile interface to the user, e.g. electric servo steering systems or steer-by-wire systems with a manual torque actuator.

In contrast to other feasible methods for the detection of motor errors, this invention uses the estimation of the motor torque to finally furnish the important hint whether and how the motor still performs its proper function (torque generation), and whether it is possible to refrain from a deactivation recommended by error detection methods of possibly parallel operation. This arrangement increases the availability of the overall system.

Figure 3:
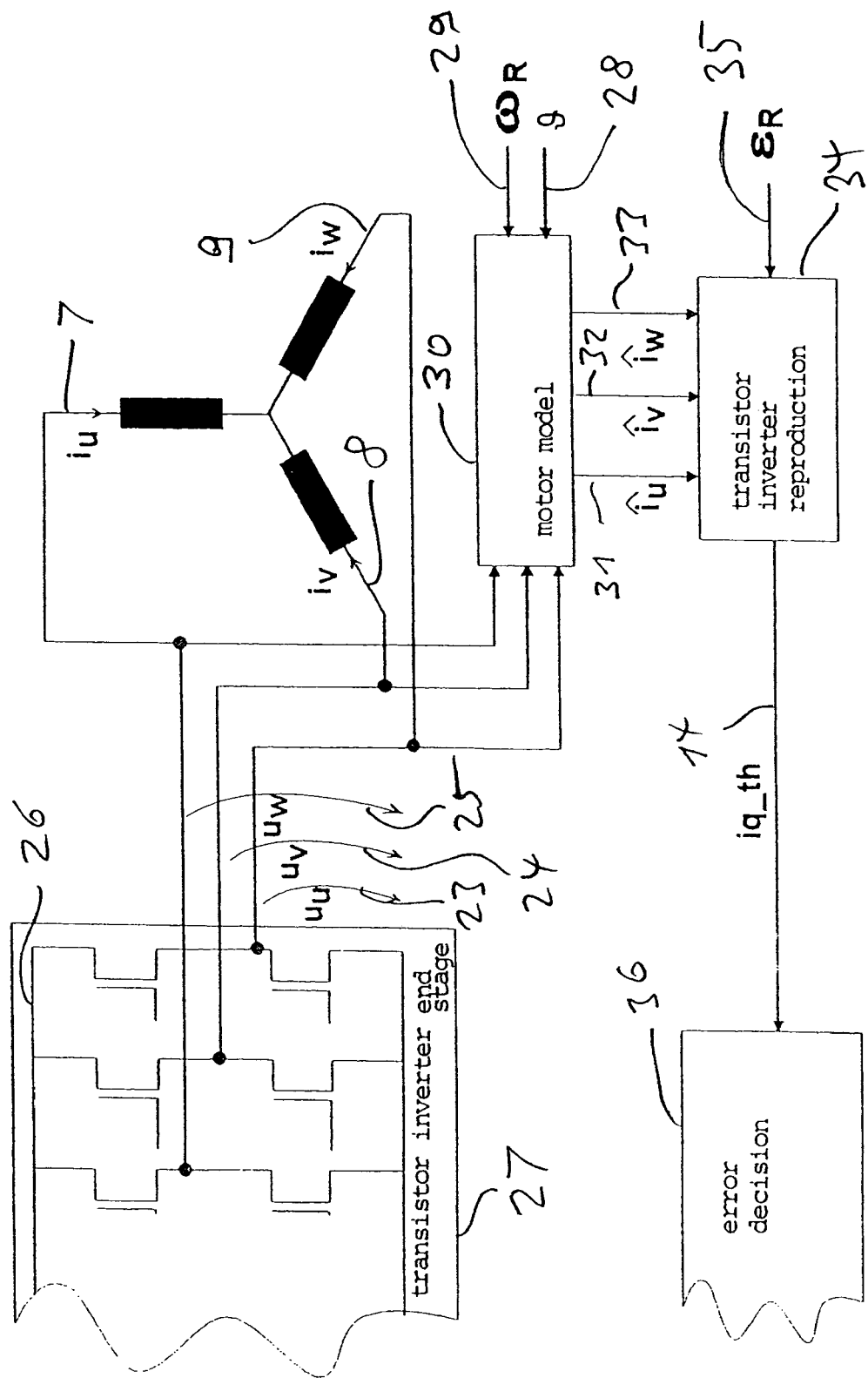
FIG. 3 is a schematic view of a variant of the method of the invention including a monitoring arrangement on the basis of phase voltages of the electric motor.

FIG. 3 shows a modified method. Instead of the phase currents $i_u$ 7, $i_v$ 8, $i_w$ 9 which are complicated to determine and adapted to be introduced by the end stage 26 of the motor control unit 2, the currents can be estimated on the basis of the corresponding voltages to neutral or phase voltages $u_u$ 23, $u_v$ 24, $u_w$ 25 that are easy to determine in consideration of the speed-proportional induced counter-voltage, and thus made available to the algorithm.

Because uncertainties increase, e.g. due to a non-linear temperature-responsive motor constant, temperature-responsive winding resistances and a high a-c component of the phase voltages, higher threshold values are adjusted with the result of longer error detection times. In addition, the winding and/or motor temperature θ 28 and the rotor speed $\omega_R$ 29 are detected and evaluated. On the basis of a motor model 30, motor phase currents $i_{u,th}$ 31, $i_{v,th}$ 32, $i_{w,th}$ 33 are estimated from the input quantities and sent as input quantities to a monitoring unit 34. Based on a model-based reproduction of the control unit 27, the estimated value for the torque-producing current iq_the is determined therein, and the determined mechanical rotor position angle $\epsilon_R$ 34 is used as another input quantity. The estimated value for the torque-producing current iq_th is then sent to the error detection 36.

One advantage in this modified method—apart from the omission of current measurement—is that short circuits in coil in the stator can be detected in addition to errors in the control unit.

The model is not supplied with the nominal value of the torque-producing current iq_nominal in the embodiments described hereinabove. Instead, the current is estimated on the basis of the phase currents (FIG. 1) or phase voltages (FIG. 3) what is favorable due to its high degree of expressiveness and possible interpretation.

Also, methods are feasible which make use of the correlation between the requested torque of a brushless motor and the current consumption of the end stage for error detection. A high current consumption of the end stage without the presence of a correspondingly high value for iq_nominal will then indicate an error. A high value for iq_nominal without a corresponding current consumption of the end stage must also be assessed as non-plausible and, hence, also indicates an error.

Due to greater uncertainties, the decision thresholds for error detection are raised once more, with the result that insignificant errors remain unnoticed. It is disadvantageous that a statement about the sense of direction of the torque is impossible. Grave errors that cause inverting of the sign of the nominal value remain unnoticed. Due to its relative simplicity, the method, is provided for defined cases of application as an additional error detection method in particularly safety-relevant systems.

The invention claimed is:

1. Method for error detection of a brushless electric motor, wherein at least one first motor parameter is measured or determined, and a second estimated motor parameter is estimated on the basis of the first motor parameter, wherein the second estimated motor parameter is compared to a nominal current producing a motor torque, and an error of the electric motor is found out according to the comparison, wherein an estimated current producing a motor torque and a quantity derived therefrom is the second estimated motor parameter and is estimated based on at least one phase motor current and a rotor position or a phase position of the electric motor, and wherein an absolute rotor position or an absolute phase position relative to a stator of the electric motor is defined by measuring a respective actual phase position variation of the rotor relative to the stator and determining the absolute phase position therefrom.

2. Method as claimed in claim 1,
wherein the second estimated motor parameter is estimated on the basis of a model.

3. Method for error detection of a brushless electric motor, wherein at least one first motor parameter is measured or determined, and a second estimated motor parameter is estimated on the basis of the first motor parameter, wherein the second estimated motor parameter is compared to a nominal current producing a motor torque, and an error of the electric motor is found out according to the comparison, wherein an estimated current producing a motor torque and a quantity derived therefrom is the second estimated motor parameter and is estimated based on at least one phase motor current and a rotor position or a phase position of the electric motor, and wherein the at least one phase motor current is estimated based on phase voltages in consideration of induced countervoltages proportional to rotational speed.

4. Method for error detection of a brushless electric motor, wherein at least one first motor parameter is measured or determined, and a second estimated motor parameter is estimated on the basis of the first motor parameter, wherein the second estimated motor parameter is compared to a nominal current producing a motor torque, and an error of the electric motor is found out according to the comparison, wherein an estimated current producing a motor torque and a quantity derived therefrom is the second estimated motor parameter, and wherein a temperature of the electric motor or windings of the electric motor or both is measured and also taken into consideration in estimating the estimated current producing the motor torque.

5. Method as claimed in claim 1,
wherein the error of the electric motor is detected by comparing a requested torque of the brushless electric motor and a current consumption of an end stage that actuates the electric motor.

6. Method a s claimed in claim 1,
wherein, if an error is found out, an alarm is issued.

7. Method a s claimed in claim 1,
wherein, if an error is found out, an error report is issued and a redundant system is activated.

* * * * *